Patented Oct. 15, 1929

1,731,354

UNITED STATES PATENT OFFICE

CARL GUSTAV SCHWALBE, OF EBERSWALDE, GERMANY

PROCESS OF CARBONIZING THE ORGANIC CONSTITUENTS OF SULPHITE CELLULOSE LYE

No Drawing. Application filed April 4, 1927, Serial No. 180,990, and in Germany March 13, 1926.

My invention pertains to the recovery of organic substances from sulphite cellulose lye, that is the spent liquor resulting from the manufacture of cellulose by the sulphite process, and more particularly to an improved process of carbonizing the organic constituents of the said sulphite liquor for use as a valuable fuel.

It has been suggested heretofore to decompose sulphite liquor by mixing and heating the same with sulphuric acid. The amount of sulphuric acid, see Swiss Patent No. 75,880 to Landmark, required for the purpose, however, is so great—at least 3.6 parts by weight of sulphuric acid to 100 parts by volume of sulphite liquor according to metrical measurement—as to be uneconomical. This method, therefore, is too costly and the process has never been carried out on a practical scale.

The object of my invention is to modify the method so as to bring about the carbonization of the organic constituents of the sulphite liquor by means of a considerably reduced quantity of sulphuric acid, as compared with the known process, and to thereby render the same economical and practically useful.

I have found that it is possible to carbonize the organic constituents of the unconcentrated waste liquor, no matter whether the latter has been desaccharized (or freed from sugar by fermentation) or not with the aid of a quantity of sulphuric acid which is equal to or even less than the amount of acid required for saturating or neutralizing the lime contained in the sulphite liquor. Thus by treating thin or unconcentrated waste sulphite liquor with the amount of sulphuric acid theoretically required for such saturation or neutralization or with a smaller amount say three-fourths of the latter, approximately 80 percent of the organic substances present in the liquor will be carbonized. The organic substances which are not reduced to carbon by the described treatment may, in addition thereto, be decomposed and recovered by a subsequent treatment with absorption carbon or coal or clay and the like.

I shall now proceed to describe in detail, for purposes of exemplification, a preferred manner in which the invention may be carred out and practised but without limiting the claimed invention to the described instance.

Example 1

A batch of crude, thin or unconcentrated and desaccharized sulphite lye is heated to a temperature of 60° to 70° C., whereupon I mix the same with three-fourths of the amount of sulphuric acid that would correspond with the predetermined quantity of lime contained in the lye, and allow the liquid to stand in order that the lime may deposit. I then suck the liquid into a digester by means of a suitable pump, and I heat the liquid in the digester to a temperature of about 180° C. at a pressure of approximately 10 atm. After having thus heated the liquid for about 8 hours, the carbonization of the organic substances will be finished. The recoverable carbon forms a muddy sediment which can be easily removed from the digester and readily separated by filtration and which forms a pulverulent mass when dried.

Example 2

Sulphite lye on having been subjected to the treatment described in Example 1, still contains organic substances which have not been reduced to carbon. In cases where the amount of sulphuric acid added to the lye is less than 3.6 k. g. to 100 litres of sulphite lye, as hereinbefore indicated, the residual lye will contain about 20 percent of the original percentage of organic substances.

For the purpose of also decomposing the organic substances of the residual lye obtained according to the process set forth in Example 1, I mix the residual lye according to the method disclosed in my prior U. S. Patent 1,615,102 with a certain quantity of absorption coal or carbon corresponding to the predetermined amount of unconverted organic substances contained in the residual lye and I then again heat the mixture to a temperature of about 180° C. for approximately 8 hours at a pressure of 10 atm.

It will be evident that my invention, while being adhered to in its main essentials, may be varied and modified in many ways. I would, therefore, have it understood, that variations and modifications which fairly fall within the true scope of the appended claims may be resorted to when found expedient.

What I claim is:

1. The process of carbonizing the organic substances of spent sulphite cellulose lye, consisting in adding to the lye a quantity of sulphuric acid which is less than 3.6 kilograms of acid to 100 litres of lye, and heating the liquid for approximately eight hours to a temperature of about 180° C. at a pressure of 10 atmospheres.

2. The process of carbonizing the organic substances of spent sulphite cellulose lye according to claim 1 wherein the deposited lime (gypsum) sediment is separated from the liquor prior to heating the latter for approximately eight hours to a temperature of about 180° C at a pressure of 10 atmospheres.

In testimony whereof I have affixed my signature.

CARL GUSTAV SCHWALBE.